(12) United States Patent
Huang et al.

(10) Patent No.: US 7,821,883 B2
(45) Date of Patent: Oct. 26, 2010

(54) COMPUTER SYSTEM AND METHOD CAPABLE OF AUTOMATICALLY DUPLICATING DATA INTO DISCS

(75) Inventors: Yao-Hsing Huang, Tao-Yuan Hsien (TW); Chung-Yi Huang, Tao-Yuan Hsien (TW); Chih-Hsun Lin, Tao-Yuan Hsien (TW)

(73) Assignee: Daxon Technology Inc., Gueishan, Tao-Yuan Hsien (TW)

( * ) Notice: Subject to any disclaimer, the term of this patent is extended or adjusted under 35 U.S.C. 154(b) by 461 days.

(21) Appl. No.: 11/930,240

(22) Filed: Oct. 31, 2007

(65) Prior Publication Data

US 2009/0034374 A1    Feb. 5, 2009

(30) Foreign Application Priority Data

Aug. 3, 2007    (TW) .............................. 96128489 A

(51) Int. Cl.
  *G11B 7/00*    (2006.01)
(52) U.S. Cl. .................. 369/30.28; 369/30.32; 369/84; 369/202; 369/206
(58) Field of Classification Search ...................... None
  See application file for complete search history.

(56) References Cited

U.S. PATENT DOCUMENTS

| 6,222,800 | B1 * | 4/2001 | Miller et al. ............. 369/30.19 |
| 7,145,841 | B1 | 12/2006 | Miller |
| 7,295,751 | B2 * | 11/2007 | Elberbaum ..................... 386/1 |
| 7,427,003 | B1 * | 9/2008 | Peterson ..................... 221/274 |
| 2008/0123476 | A1 * | 5/2008 | Liu et al. ................. 369/30.28 |

FOREIGN PATENT DOCUMENTS

TW            594693 B        6/2004

\* cited by examiner

*Primary Examiner*—Muhammad N. Edun
(74) *Attorney, Agent, or Firm*—Winston Hsu

(57) ABSTRACT

The invention relates to a computer system capable of automatically duplicating data into discs with automatically blank-disc-supplying. The invention can be implemented by software, hardware, or any of the combinations. Since the invention does not utilize a mechanical arm to move the discs, the structure of the invention saves space compared with a traditional disc duplicating machine; moreover, the cost is less than that of the prior art.

25 Claims, 4 Drawing Sheets

COMPUTER SYSTEM AND METHOD CAPABLE OF AUTOMATICALLY DUPLICATING DATA INTO DISCS

BACKGROUND OF THE INVENTION

1. Field of the Invention

The invention relates to a computer system of duplicating data into discs with automatically blank-disc-supplying and a method capable of automatically duplicating data into discs.

2. Description of the Prior Art

At present, when a user wants to duplicate data into a disc, a disc is manually disposed into a duplicator. After the duplication is finished, the disc is again manually taken out. If the user wants to duplicate data into a lot of discs, it is wasting time for the user to use this manual duplicating apparatus.

Therefore, an automatic duplicating apparatus of duplicating data into discs with automatic blank-disc-supplying by using a mechanical arm was developed. However, although the aim of duplicating data into discs with automatic blank-disc-supplying can be reached by using the mechanical arm to pick up the disc, the structure of the duplicating apparatus is apparently complicated and needs physically space-occupied and uneconomically expensive. The related prior art can be referred to in Taiwan patent NO. 594,693 and U.S. Pat. No. 7,145,841.

Therefore, the scope of the invention is to provide a computer system of automatically duplicating data into discs with automatic blank-disc-supplying and a method capable of automatically duplicating data into discs to solve the above problems.

SUMMARY OF THE INVENTION

A scope of the invention is to provide a computer system capable of duplicating data into discs with automatic blank-disc-supplying and a method of automatically duplicating data into discs.

According to an embodiment of the invention, the computer system capable of duplicating data into discs with automatic blank-disc-supplying comprises a host, a disc holding unit, a first actuating unit, a data duplicating unit, a second actuating unit, a disc collecting unit, a first limit switch, and a second limit switch.

In the embodiment, the host comprises a first housing and a second housing. The disc holding unit is set on the second housing. The disc holding unit comprises a third housing and a fourth housing, which is capable of rotating under the third housing. A first actuating unit and the fourth housing are connected to rotating the fourth housing, and then one of the discs fall down during the process of duplicating data into the disc.

The data duplicating unit is set in the first housing. The data duplicating unit comprises a disc tray capable of being selectively ejected beneath the disc holding unit to receive the disc falling from the disc holding unit. The second actuating unit and the disc tray are connected to actuate the disc tray opening or closing. The disc collecting unit is set in the second housing and located under the ejected disc tray for collecting the discs falling from the disc tray.

Based on the structure of the aforementioned computer system, according to the invention, the method of automatically duplicating data into discs comprises the following steps:

(a) a plurality of discs are set in the disc holding unit;

(b) a disc tray is ejected from the data duplicating unit to be beneath the disc holding unit, and the second actuating unit actuates the disc tray to open when the disc tray touches a first limit switch;

(c) when the disc tray is opened and then touches a second limit switch, the second actuating unit actuates the disc tray to close after a predetermined period of time;

(d) after the disc tray is closed, the first actuating unit actuates the fourth housing to rotate, so as to let one of the discs fall down to the disc tray;

(e) the disc tray is actuated to enter the data duplicating unit, and it begins to duplicate data into the disc;

(f) after the duplication process is finished, the disc tray is ejected from the data duplicating unit, and when the disc tray touches the first limit switch, the second actuating unit actuates the disc tray to open, so as to let the disc fall into the disc collecting unit located under the ejected disc tray; and (g) repeating steps (c) to step (f) until each of the discs is completely duplicated.

In this way, duplicating data into discs with automatically blank-disc-supplying can be easily achieved in the invention. In addition, since there is no mechanical arm in this invention, the structural design can save space and money compared to that in the prior art.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
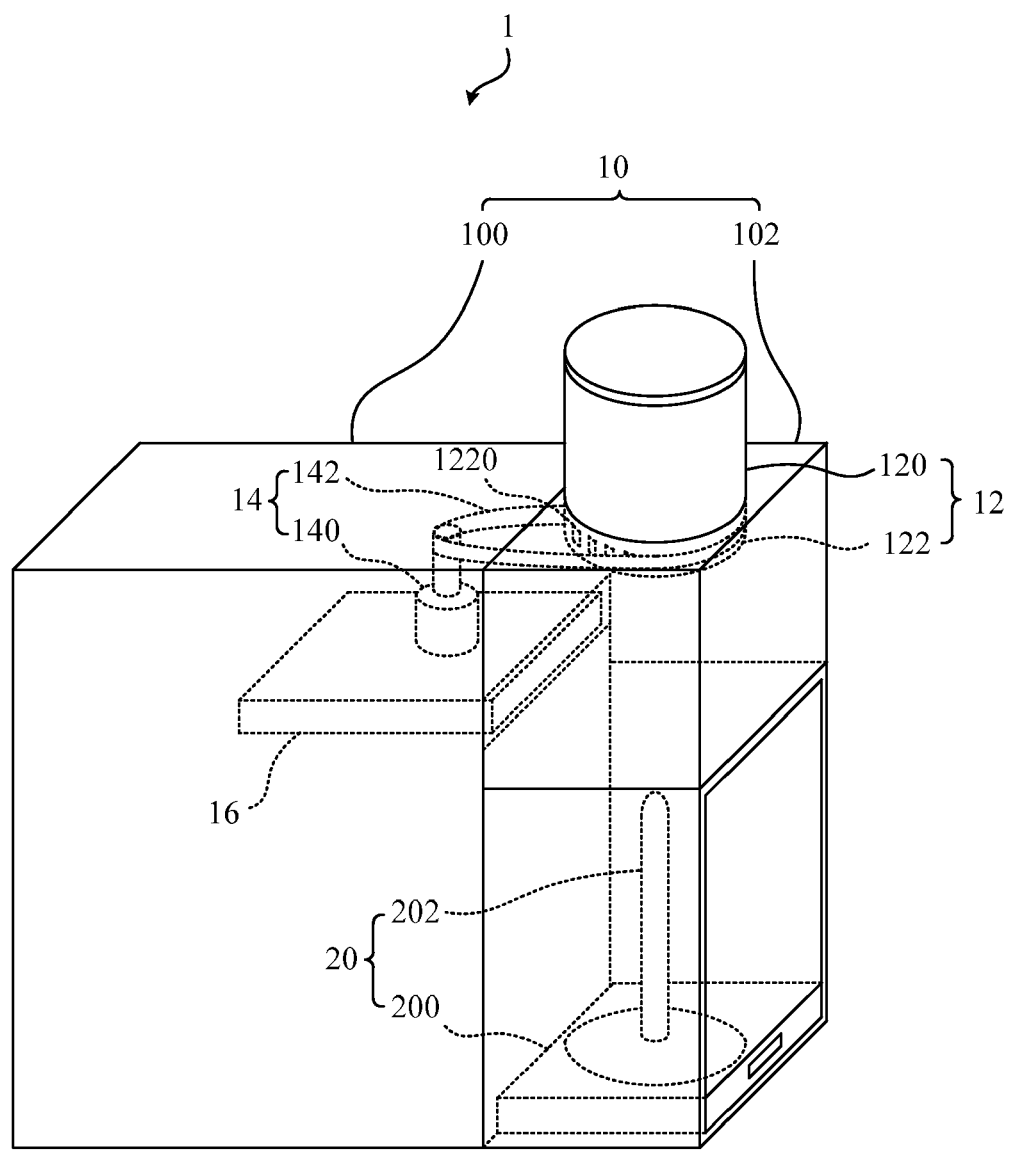
FIG. 1 is a schematic diagram of the computer system in an embodiment according to the invention.
Figure 2:
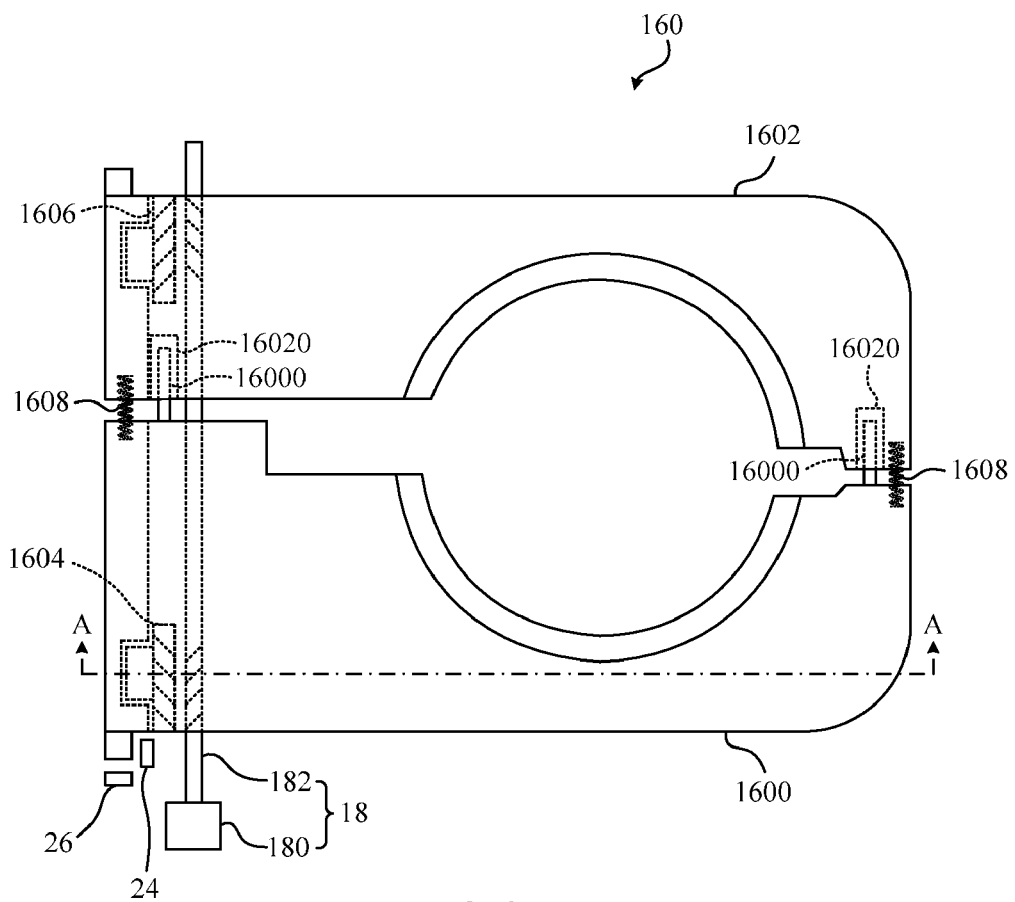
FIG. 2 is a schematic diagram of the disc tray in an embodiment according to the invention.
Figure 3:
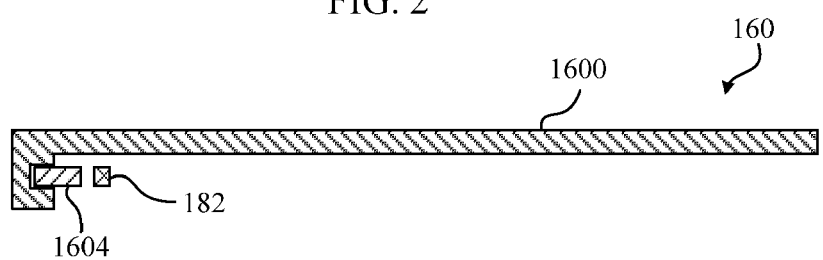
FIG. 3 is a cross-sectional view of the disc tray shown in FIG. 2 along the A-A line.
Figure 4:
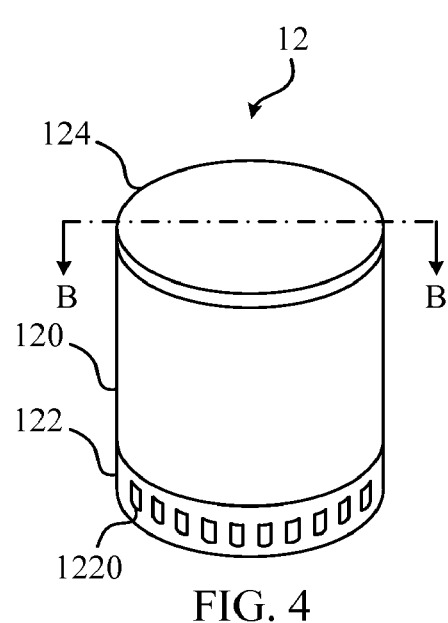
FIG. 4 is a schematic diagram of the disc holding unit shown in FIG. 1.
Figure 5:
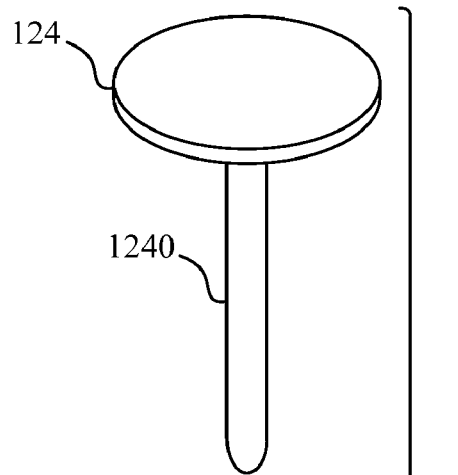
FIG. 5 is a cross-sectional view of the disc holding unit shown in FIG. 4 along the B-B line.
Figure 5:
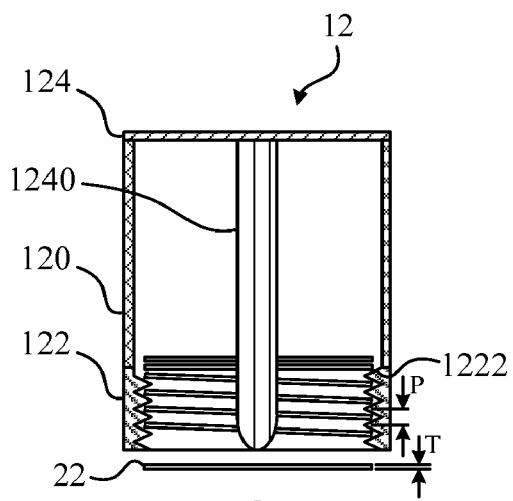
Figure 6:
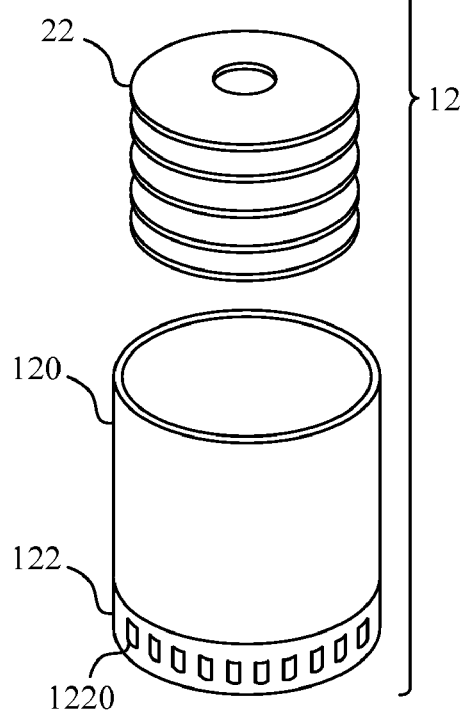
FIG. 6 is an enlarged blown-up view of the disc holding unit shown in FIG. 4.

Please refer to FIG. 1 to FIG. 6. FIG. 1 is a schematic diagram of the computer system 1 in an embodiment according to the invention. FIG. 2 is a schematic diagram of the disc tray 160 in an embodiment according to the invention. FIG. 3 is a cross-sectional view of the disc tray 160 shown in FIG. 2 along the A-A line. FIG. 4 is a schematic diagram of the disc holding unit 12 shown in FIG. 1. FIG. 5 is a cross-sectional view of the disc holding unit 12 shown in FIG. 4 along the B-B line. FIG. 6 is a blown-up view of the disc holding unit 12 shown in FIG. 4.

As shown in FIG. 1 and FIG. 2, the computer system 1 comprises a host 10, a disc holding unit 12, a first actuating unit 14, a data duplicating unit 16, a second actuating unit 18, and a disc collecting unit 20.

The host 10 comprises a first housing 100 and a second housing 102. The disc holding unit 12 is set on the second housing 102. The disc holding unit 12 comprises a third housing 120 and a fourth housing 122 capable of rotating under the third housing 120. In the embodiment, the third housing 120 is exposed outside the second housing 102, and the fourth housing is hidden in the second housing 102.

As shown in FIG. 1, the fourth housing 122 comprises an outer thread 1220, and the first actuating unit 14 comprises a first motor 140 and a belt 142. The first motor 140 and the outer thread 1220 of the fourth housing 122 are connected by the belt 142. In addition, as shown in FIG. 5, the fourth housing 122 comprises an inner thread 1222 for holding the discs 22, and when the fourth housing 122 rotates under the third housing 120, each of the discs 22 falls in proper order through the inner thread 1222. In the embodiment, a pitch P of the inner thread 1222 is designed to be larger than the thickness T of each disc 22. The disc holding unit 12 further comprises a cover 124, and the cover 124 has a disc conducting rod 1240. When the cover 124 covers on the third housing 120, the disc conducting rod 1240 is capable of assisting the positioning of each disc 22 in the disc holding unit 12.

As shown in FIG. 1 to FIG. 3, the data duplicating unit 16 is set in the first housing 100 and comprises a disc tray 160. The disc tray 160 is capable of being selectively ejected beneath the disc holding unit 12 to receive the disc 22 falling from the disc holding unit 12. After the data duplication is completed into the disc 22 in the data duplicating unit 16, the disc tray 160 is ejected and then is opened to let the disc 22 fall out.

In the embodiment, the disc tray 160 comprises a first plate component 1600 and a second plate component 1602. A first screw 1604 is set on the first plate component 1600, and a third screw 1606 is set on the second plate component 1602. In addition, the second actuating unit 18 comprises a second motor 180 and a second screw 182, and the computer system 1 further comprises a first limit switch 24 and a second limit switch 26. In practical applications, the first screw 1604 is capable to be set on the first plate component 1600, or the third screw 1606 is capable to be set on the second plate component 1602.

As shown in FIG. 2, when the disc tray 160 is ejected and then touches the first limit switch 24, the second motor 180 will actuate the second screw 182 to drive the first screw 1604 and the third screw 1606 and then to open the disc tray 160. When the disc tray 160 opens and touches the second limit switch 26, the second motor 180 will actuate the second screw 182 to actuate the disc tray 160 closing after a predetermined period of time. When the disc tray 160 is closed, the first actuating unit 14 will actuate the fourth housing 122 of the disc holding unit 12 to let the disc 22 fall out.

After the disc 22 falls on the disc tray 160, the disc tray 160 is actuated to enter the data duplicating unit 16, and then the data duplicating unit 16 begins to duplicate data into the disc 22. The disc tray 160 will be ejected out from the data duplicating unit 16 after the duplication finishing. When the disc tray 160 touches the first limit switch 24, the second actuating unit 18 actuates the disc tray 160 to open, so as to let the duplicated disc 22 fall into the disc collecting unit 20 located under the ejected disc tray 160.

As shown in FIG. 1, the disc collecting unit 20 comprises a base 200 and a shaft 202. The base 200 is capable of being drawn from the second housing 102 of the host 10. The discs 22 falling from the disc tray 160 are collected by the shaft 202.

There are at least one guiding rod and at least one corresponding guiding groove to assist the positioning. In the embodiment, as shown in FIG. 2, the first plate component 1600 has two guiding rods 16000, and the second component 1602 has two corresponding guiding grooves 16020. The guiding rod 16000 is movable to be disposed in the corresponding guiding groove 16020. When the first plate component 1600 moves closer to the second plate component 1602, the guiding rod 16000 and the guiding groove 16020 will assist the positioning.

In addition, the disc tray 160 can also comprise at least one elastic member 1608 (e.g., two elastic members 1608 shown in FIG. 2). The elastic member 1608 is connected to the first plate component 1600 and the second plate component 1602. The elasticity provided by the elastic member 1608 can assist the closing of the disc tray 160.

Figure 7:
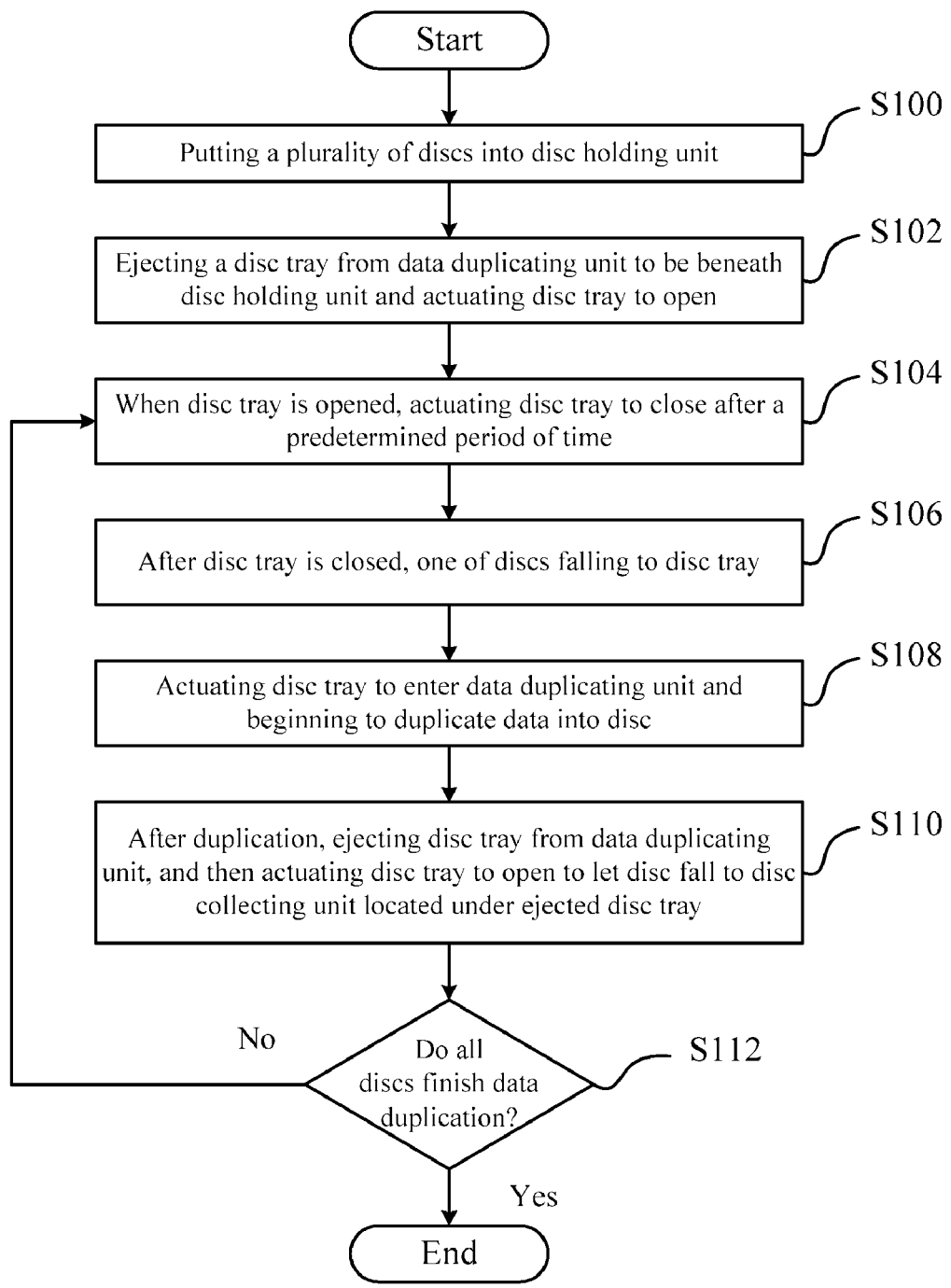
FIG. 7 is a flow chart of the method of automatically duplicating data into discs in an embodiment according to the invention.

Please refer to FIG. 7. FIG. 7 is a flow chart of the method of automatically duplicating data into discs according to the present invention. Please also refer to FIG. 1 to FIG. 6: based on the structure of the aforementioned computer system 1, the method of automatically duplicating data into discs according to the present invention comprises the following steps.

Firstly, at step S100: a plurality of discs 22 are hold in the disc holding unit 12. Next, at step S102; a disc tray 160 is actuated to be ejected from the data duplicating unit 16 to be beneath the disc holding unit 12, and then the disc tray 160 is actuated to open when the disc tray 160 touches a first limit switch 24. Then, at step S104: when the disc tray 160 is opened and then touches a second limit switch 26, the disc tray 160 is actuated to close after a predetermined period of time. At step S106: after the disc tray 160 is closed, the fourth housing 122 of the disc holding unit 12 is actuated to rotate and one of the discs 22 falls on the disc tray 160. Afterwards, at step S108: the disc tray 160 is actuated to enter the data duplicating unit 16, and the data begins to be duplicated into the disc 22. Next, at step S110: after duplication, the disc tray 160 is actuated to eject out the data duplicating unit 16, and when the disc tray 160 touches the first limit switch 24, the disc tray 160 is actuated to open to let the disc 22 fall into the disc collecting unit 20 located under the ejected disc tray 160. Finally, at step S112: step S104 to step 110 are repeated until the data duplication of every discs 22 are completed.

In another embodiment, the control logic shown in FIG. 7 can be achieved by software. The software can be performed in a computer, such as a laptop or a desktop. Of course, each part or function in the control logic can be achieved by software, hardware, or a combination of software and hardware. In addition, the control logic shown in FIG. 7 can be stored in the data of the computer readable storage medium and be operated exteriorized. The computer readable storage medium can be a floppy disc, a hard disc, an optical disc, other magnetic storages or other optical storages, or a combined apparatus. The data representing command, stored in the computer readable storage medium, can be performed by computer to generate a controlling order, so as to further control the computer system 1 to automatically supply blank discs and automatically duplicate data into discs.

Compared with prior art, duplicating data into discs with automatic blank-disc-supplying can be easily realized in the invention. In addition, because the mechanical arm is not needed in the present invention, the structural design saves space and money compared with that in the prior art.

With the above example and explanation, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A computer system capable of duplicating data into discs with automatically blank-disc-supplying comprising:
   a host comprising a first housing and a second housing;
   a disc holding unit, set on the second housing, for holding a plurality of discs;
   a data duplicating unit, set in the first housing, comprising a disc tray capable of being selectively ejected to be beneath the disc holding unit to receive the disc falling from the disc holding unit; and
   a disc collecting unit, set in the second housing and located under the ejected disc tray, for receiving the discs falling from the disc tray.

2. The computer system of claim 1, wherein the disc holding unit comprises a third housing and a fourth housing capable of rotating under the third housing.

3. The computer system of claim 2, wherein the third housing is exposed outside the second housing, and the fourth housing is hidden in the second housing.

4. The computer system of claim 2, further comprising a first actuating unit, connected to the fourth housing, for selectively actuating the fourth housing to rotate, so as to let one of the discs fall.

5. The computer system of claim 4, wherein the fourth housing comprises an outer thread, the first actuating unit comprises a first motor and a belt for connecting the first motor and the outer thread of the fourth housing.

6. The computer system of claim 2, wherein the fourth housing comprises an inner thread for supporting the discs, and when the fourth housing rotates with respect to the third housing, each of the discs falls in order through the inner thread.

7. The computer system of claim 6, wherein a pitch of the inner thread is larger than a thickness of each disc.

8. The computer system of claim 1, further comprising a second actuating unit, connected to the disc tray, for actuating the disc tray to open/close.

9. The computer system of claim 8, wherein the disc tray comprises a first plate component and a second plate component, a first screw rod is attached on the first plate component.

10. The computer system of claim 9, wherein the second actuating unit comprises a second motor and a second screw rod, after ejecting the disc tray, the first screw rod is connected to the second screw rod, such that the second motor is capable of actuating the second screw rod to drive the first screw rod to open/close the disc tray.

11. The computer system of claim 10, wherein a third screw rod is attached on the second plate component, after ejecting the disc tray, the second motor actuates the second screw rod to drive the first screw rod and the third screw rod to open/close the disc tray.

12. The computer system of claim 9, wherein the first plate component has at least one guiding rod, the second plate component has at least one guiding groove, and the guiding rod is movably disposed in the corresponding guiding groove.

13. The computer system of claim 9, wherein the disc tray comprises at least one resilient member for connecting the first plate component and the second plate component.

14. The computer system of claim 8, further comprising a first limit switch and a second limit switch, wherein when the disc tray is ejected and then touches the first limit switch, the second actuating unit actuates the disc tray to open, and when the disc tray is opened and then touches the second limit switch, the second actuating unit actuates the disc tray to close after a predetermined period of time.

15. The computer system of claim 1, wherein the disc collecting unit comprises a base and a shaft, the base is capable of being drawn from the second housing, and the disc which falls from the disc tray is collected by the shaft.

16. The computer system of claim 1, wherein the disc holding unit comprises a cover with a disc conducting rod.

17. A method of automatically duplicating data into discs in a computer system, the computer system comprising a host, the host comprising a first housing and a second housing, a disc holding unit set on the second housing, a data duplicating unit set in the first housing, a disc collecting unit set in the second housing, the method comprising steps of:
   (a) putting a plurality of discs into the disc holding unit;
   (b) ejecting a disc tray from the data duplicating unit to be beneath the disc holding unit, and actuating the disc tray to open;
   (c) when the disc tray is opened, actuating the disc tray to close after a predetermined period of time;
   (d) after the disc tray is closed, one of the discs falling to the disc tray;
   (e) actuating the disc tray to enter the data duplicating unit and beginning to duplicate data into the disc;
   (f) after duplication, ejecting the disc tray from the data duplicating unit, and then actuating the disc tray to open to let the disc fall to the disc collecting unit located under the ejected disc tray; and
   (g) repeating step (c) to step (f) until each of the discs finishes duplicating the data.

18. The method of claim 17, wherein the disc holding unit comprising a third housing, and a fourth housing capable of rotating under the third housing, step (d) comprises step of actuating the fourth housing to rotate to let the disc fall to the disc tray.

19. The method of claim 18, wherein the fourth housing comprises an outer thread, the computer system comprises a first motor and a belt for connecting the first motor and the outer thread of the fourth housing, and in step (d), the first motor is actuated to drive the belt to actuate the fourth housing to rotate.

20. The method of claim 19, wherein the fourth housing has an inner thread for supporting the discs, and in step (d), the fourth housing is actuated to rotate to let each of the discs fall in order through the inner thread.

21. The method of claim 17, wherein the disc tray comprises a first plate component and a second plate component, a first screw rod is attached on the first plate component, the computer system comprises a second motor and a second screw rod, after ejecting the disc tray, in step (b), (c) or (f), the second screw rod is actuated by the second motor to drive the first screw rod to open/close the disc tray.

22. The method of claim 21, wherein a third screw rod is attached on the second plate component, after ejecting the disc tray, in step (b), (c) or (f), the second screw rod is actuated by the second motor to drive the first screw rod and the third screw rod to open/close the disc tray.

23. A computer readable storage medium storing a set of instructions executable by a computer system for automatically duplicating data into a plurality of discs, the computer readable storage medium comprising:
   instructions for ejecting a disc tray from a data duplicating unit to be beneath a disc holding unit;
   instructions for actuating the disc tray to open when the disc tray touches a first limit switch;
   instructions for actuating the disc tray to close after a predetermined period of time when the disc tray is opened and touches a second limit switch;
   instructions for actuating the disc holding unit to rotate after the disc tray is closed, so as to let one of the discs fall onto the disc tray;

instructions for actuating the disc tray to enter the data duplicating unit;

instructions for duplicating the data into the disc;

instructions for ejecting the disc tray from the data duplicating unit after duplication; and instructions for repeating duplication until each of the discs finishes duplicating the data.

24. The computer readable storage medium of claim 23, comprising:

instructions for actuating a first motor to drive a belt connected to the disc holding unit after the disc tray is closed, so as to actuate the disc holding unit to rotate.

25. The computer readable storage medium of claim 23, comprising:

instructions for actuating a second motor to rotate a second screw rod when the disc tray touches the first limit switch, so as to drive at least one first screw rod on the disc tray to open the disc tray; and instructions for actuating the second motor to rotate the second screw rod after the predetermined period of time when the disc tray is opened and then touches the second limit switch, so as to drive the at least one first screw rod on the disc tray to close the disc tray.

* * * * *